(12) United States Patent
Ramani

(10) Patent No.: US 12,705,054 B2
(45) **Date of Patent: *Aug. 11, 2026**

(54) SPECULATIVE EXECUTION USING A PAGE-LEVEL TRACKED LOAD ORDER QUEUE

(71) Applicant: ADVANCED MICRO DEVICES, INC., Santa Clara, CA (US)

(72) Inventor: Krishnan V. Ramani, Santa Clara, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 17/543,952

(22) Filed: Dec. 7, 2021

(65) Prior Publication Data

US 2023/0176868 A1 Jun. 8, 2023
US 2024/0176618 A9 May 30, 2024

Related U.S. Application Data

(63) Continuation of application No. 16/658,688, filed on Oct. 21, 2019, now Pat. No. 11,194,583.

(51) Int. Cl.
*G06F 9/30* (2018.01)
*G06F 9/38* (2018.01)
*G06F 12/0875* (2016.01)

(52) U.S. Cl.
CPC ........ *G06F 9/30043* (2013.01); *G06F 9/3851* (2013.01); *G06F 12/0875* (2013.01); *G06F 2212/452* (2013.01)

(58) Field of Classification Search
CPC ........... G06F 12/0875; G06F 2212/452; G06F 9/30043
USPC ........................................................ 711/125
See application file for complete search history.

(56) References Cited

U.S. PATENT DOCUMENTS 5,809,550 A * 9/1998 Shukla ................ G06F 12/0804 711/E12.04
6,715,057 B1 3/2004 Kessler et al.
7,139,877 B2 11/2006 Hooker
8,943,278 B2 1/2015 Pohlack et al.
9,639,464 B2 5/2017 Eran et al.
10,860,319 B2 12/2020 Dechene et al.
(Continued)

FOREIGN PATENT DOCUMENTS

WO 2013188460 A2 12/2013
WO 2013188460 A3 3/2014

OTHER PUBLICATIONS

Abella et al.; "SAMIE-LSQ: Set-Associative Multiple-Instruction Entry Load/Store Queue", Proceedings. 20th International Parallel and Distributed Processing Symposium (IEEE Cat. No. 06TH8860), IEEE Piscataway, NJ, USA, Apr. 25, 2006 (Apr. 25, 2006), pp. 1-10.
(Continued)

*Primary Examiner* — Gautam Sain

(57) ABSTRACT

Speculative execution using a page-level tracked load order queue includes: determining that a first load instruction targets a determined memory region; and in response to the first load instruction targeting the determined memory region, adding an entry to a page-level tracked load order queue instead of a load order queue, where the entry indicates a page address of a target of the first load instruction.

20 Claims, 6 Drawing Sheets

(56) References Cited

U.S. PATENT DOCUMENTS

2004/0073906 A1* 4/2004 Chamdani ............. G06F 9/3838 712/E9.05
2008/0162868 A1* 7/2008 Glew .................. G06F 12/1027 711/202
2008/0168230 A1* 7/2008 Shen ..................... G06F 12/121 711/E12.07
2009/0019272 A1* 1/2009 Cypher ................. G06F 9/3834 712/E9.033
2014/0006718 A1* 1/2014 Ramani-Augustin ........................ G06F 9/3455 711/137
2014/0129806 A1* 5/2014 Kaplan ................. G06F 9/3834 712/E9.016
2015/0199272 A1* 7/2015 Goel ................... G06F 12/0844 711/146
2016/0378658 A1 12/2016 Gschwind et al.
2017/0235579 A1 8/2017 Knauth et al.
2019/0146874 A1 5/2019 Gschwind et al.
2019/0146929 A1 5/2019 Gschwind et al.
2020/0394039 A1* 12/2020 Kesiraju ............... G06F 9/3824

OTHER PUBLICATIONS

Baugh et al.; "Decomposing the Load-Store Queue by Function for Power Reduction and Scalability", IBM Journal of Research and Development, vol. 50, No. 2.3, Mar. 1, 2006 (Mar. 1, 2006), pp. 287-297.

Castro et al.; "Load-Store Queue Management: an Energy-Efficient Design Based on a State-Filtering Mechanism", Computer Design, 2005. Proceedings. 2005 International Conference on San Jose, CA, USA Oct. 2-5, 2005, Piscataway, NJ, USA, IEEE,Oct. 2, 2005 (Oct. 2, 2005), pp. 617-624.

International Search Report & Written Opinion for PCT/US2020/056209, Feb. 8, 2021, 11 pages.

* cited by examiner

SPECULATIVE EXECUTION USING A PAGE-LEVEL TRACKED LOAD ORDER QUEUE

CROSS-REFERENCE TO RELATED APPLICATION

This application is a continuation application of and claims priority from U.S. Pat. No. 11,194,583, issued on Dec. 7, 2021.

BACKGROUND

During out-of-order execution of instructions, speculatively executed load instructions can be added to a load order queue. When older loads from the same thread have completed execution, the speculatively executed load can be removed from the load order queue. When the load order queue is full, further speculative execution is not allowed.

DETAILED DESCRIPTION

Figure 1:
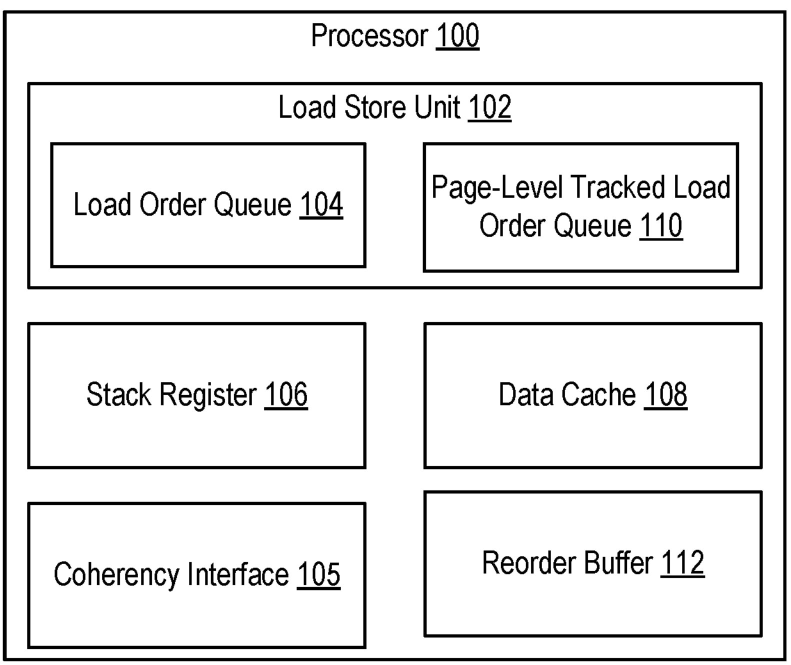
FIG. 1 is a block diagram of an example processor for speculative execution using a page-level tracked load order queue according to some embodiments.

In some embodiments, a method of speculative execution using a page-level tracked load order queue, the method includes: determining that a first load instruction targets a determined memory region; and in response to the first load instruction targeting the determined memory region, adding an entry to a page-level tracked load order queue instead of a load order queue, where the entry indicates a page address of a target of the first load instruction.

In some embodiments, the method further includes determining that a second load instruction targets the determined memory region; determining, that the second load instruction targets the page address identified in the entry; and updating an activity counter of the entry. In some embodiments, the method further includes determining that a second load instruction does not target the determined memory region; and adding an entry to the load order queue based on the second load instruction. In some embodiments, the method further includes determining, based on a state of a re-order buffer, to remove the entry from the page-level tracked load order queue. In some embodiments, determining, based on the state of the re-order buffer, to remove the entry from the page-level tracked load order queue includes: decrementing, based on the state of the reorder buffer, an activity counter of the entry; and removing, based on the activity counter, the entry from the page-level tracked load order queue. In some embodiments, the determined memory region is a program stack, and determining that the load instruction targets a determined memory region includes determining that the first load instruction targets a memory address relative to a stack pointer. In some embodiments, the first load instruction is associated with a first thread, and the method further includes: receiving a query from a second thread indicating a store instruction target; and initiating a pipeline flush in response to the store instruction target including the page address identified in the entry.

In some embodiments, a load store unit for speculative execution using a page-level tracked load order queue performs steps including: determining that a first load instruction targets a determined memory region; and in response to the first load instruction targeting the determined memory region, adding an entry to a page-level tracked load order queue instead of a load order queue, where the entry indicates a page address of a target of the first load instruction.

In some embodiments, the steps further include determining that a second load instruction targets the determined memory region; determining, that the second load instruction targets the page address identified in the entry; and updating an activity counter of the entry. In some embodiments, the steps further include determining that a second load instruction does not target the determined memory region; and adding an entry to the load order queue based on the second load instruction. In some embodiments, the steps further include determining, based on a state of a re-order buffer, to remove the entry from the page-level tracked load order queue. In some embodiments, determining, based on the state of the re-order buffer, to remove the entry from the page-level tracked load order queue includes: decrementing, based on the state of the reorder buffer, an activity counter of the entry; and removing, based on the activity counter, the entry from the page-level tracked load order queue. In some embodiments, the determined memory region is a program stack, and determining that the load instruction targets a determined memory region includes determining that the first load instruction targets a memory address relative to a stack pointer. In some embodiments, the first load instruction is associated with a first thread, and the steps further include: receiving a query from a second thread indicating a store instruction target; and initiating a pipeline flush in response to the store instruction target including the page address identified in the entry.

In some embodiments, a processor for speculative execution using a page-level tracked load order queue includes a load store unit that performs steps including: determining that a first load instruction targets a determined memory region; and in response to the first load instruction targeting the determined memory region, adding an entry to a page-level tracked load order queue instead of a load order queue, where the entry indicates a page address of a target of the first load instruction.

In some embodiments, the steps further include determining that a second load instruction targets the determined memory region; determining, that the second load instruction targets the page address identified in the entry; and updating an activity counter of the entry. In some embodiments, the steps further include determining that a second load instruction does not target the determined memory region; and adding an entry to the load order queue based on the second load instruction. In some embodiments, the steps further include determining, based on a state of a re-order buffer, to remove the entry from the page-level tracked load order queue. In some embodiments, determining, based on the state of the re-order buffer, to remove the entry from the page-level tracked load order queue includes: decrementing, based on the state of the reorder buffer, an activity counter of the entry; and removing, based on the activity counter, the entry from the page-level tracked load order queue. In some embodiments, the determined memory region is a program stack, and determining that the load instruction targets a determined memory region includes determining that the first load instruction targets a memory address relative to a stack pointer. In some embodiments, the first load instruction is associated with a first thread, and the steps further include: receiving a query from a second thread indicating a store instruction target; and initiating a pipeline flush in response to the store instruction target including the page address identified in the entry.

In some embodiments, an apparatus for speculative execution using a page-level tracked load order queue includes a processor including a load store unit that performs steps including: determining that a first load instruction targets a determined memory region; and in response to the first load instruction targeting the determined memory region, adding an entry to a page-level tracked load order queue instead of a load order queue, where the entry indicates a page address of a target of the first load instruction.

In some embodiments, the steps further include determining that a second load instruction targets the determined memory region; determining, that the second load instruction targets the page address identified in the entry; and updating an activity counter of the entry. In some embodiments, the steps further include determining that a second load instruction does not target the determined memory region; and adding an entry to the load order queue based on the second load instruction. In some embodiments, the steps further include determining, based on a state of a re-order buffer, to remove the entry from the page-level tracked load order queue. In some embodiments, determining, based on the state of the re-order buffer, to remove the entry from the page-level tracked load order queue includes: decrementing, based on the state of the reorder buffer, an activity counter of the entry; and removing, based on the activity counter, the entry from the page-level tracked load order queue. In some embodiments, the determined memory region is a program stack, and determining that the load instruction targets a determined memory region includes determining that the first load instruction targets a memory address relative to a stack pointer. In some embodiments, the first load instruction is associated with a first thread, and the steps further include: receiving a query from a second thread indicating a store instruction target; and initiating a pipeline flush in response to the store instruction target including the page address identified in the entry.

FIG. 1 is a block diagram of a non-limiting example processor 100 according to some embodiments. The example processor 100 can be implemented in a variety of computing devices, including mobile devices, personal computers, peripheral hardware components, gaming devices, set-top boxes, and the like. The processor 100 includes a load store unit 102. The load store unit 102 is a specialized execution unit (e.g., a combination of logic and/or circuitry) responsible for executing load and store instructions, generating virtual addresses of load and store operations, loading data from memory and/or storing data to memory from registers.

The processor 100 executes some instructions out of order to increase performance. Accordingly, the load store unit 102 speculatively executes load instructions out of order relative to other instructions. To do so, the load store unit 102 maintains a load order queue 104. The load order queue 104 is a data structure that stores, in each entry, a speculatively executed load instruction. When all older loads relative to the speculatively executed load in the load order queue 104 entry are committed, the entry can be removed from the load order queue.

The load store unit 102 can receive a query from another thread (e.g., from another processor or core via a coherency interface 105) indicating a memory address being accessed (e.g., written to) by the other thread. Where the memory address matches an entry in the load order queue 104, an ordering violation has occurred since the speculatively executed load could be incorrect. Accordingly, the execution pipeline must be flushed.

In existing solutions, all speculatively executed load instructions are added to the load order queue 104 or a similar data structure (e.g., load store queue, load queue). When the load order queue 104 is full, no additional load instructions can be speculatively executed, decreasing performance. In contrast, the load store unit 102 of the processor 100 for speculative execution using a page-level tracked load order queue determines whether a load instruction (e.g., a speculatively executed load instruction) targets a determined memory region. The determined memory region can include the program stack. Accordingly, the load store unit 102 determines if the load instruction targets a memory address relative to a stack pointer stored in a stack register 106. For example, the instruction "mov regX, [rsp+offset]" targets the program stack (the determined memory region) as the memory address from which the data is loaded is calculated by adding an offset to the stack pointer in the stack register 106 (identified as "rsp" in the instruction). In contrast, the instruction "regX, [regBase+regIndex+offset]" does not target the determined memory area as the memory address from which the data is loaded is independent of the stack pointer.

Load instructions targeting the program stack mostly hit the data cache 108 and therefore process quickly compared to other load instructions. In many program scenarios (e.g., in highly looped or iterative codes), load instructions targeting the program stack disproportionately outnumber other load instructions, and therefore would disproportionately be loaded into the load order queue 104, filling it and stalling further speculative execution.

In response to the load instruction targeting the determined memory region, the load store unit 102 adds an entry to a page-level tracked load order queue 110 instead of the load order queue 104. The entry indicates a page address of a target of the load instruction (e.g., a page address of a memory location the determined memory region). The page size indicated in the entry is dependent on the minimum page size of the operating system being executed. Thus, for an operating system implementing a 4 kilobyte minimum page size, each entry indicates a 4 kilobyte page address of a page in the determined memory region.

Each entry in the page-level tracked load order queue 110 also includes an activity counter indicating a recency at which a load instruction targeting the page of the entry was speculatively executed. For example, the activity counter can include multiple bits (e.g., two bits) initially all set to "1." As additional instructions are executed and/or committed, as described below, the activity counter can be right-shifted by one place. For example, a two-bit activity counter set to "11" would be shifted to "01." The activity counter can later be set to "00" indicating that the entry can be removed from the page-level tracked load order queue 110.

Assuming an entry for a first load instruction is stored in the page-level tracked load order queue 110, the load store unit 102 can determine that a second load instruction targets the determined memory region. If the second load instruction targets the page address identified in the entry, the load store unit 102 updates the activity counter of the entry. For example, if the activity counter of the entry is set to "01," the activity counter would be updated to "11." As another example, if the activity counter of the entry is set to "11," the activity counter would remain as "11." Thus, instead of a new entry being added to the page-level tracked load order queue 110 for the second load instruction, the activity counter is updated. This allows for multiple speculatively executed load instructions targeting the same page address of the determined memory region to be reflected by a single entry in the page-level tracked load order queue 110. Accordingly, this provides for more efficient memory usage compared to existing solutions where all load instructions are each reflected by a corresponding entry in a load order queue 104 or equivalent data structure. If the second load instruction instead targeted a page address not included in an entry of the page-level tracked load order queue 110, a new entry in the page-level tracked load order queue would be created for the second load instruction.

The load store unit 102 can also determine that a received speculatively executed load instruction does not target the determined memory region. The load store unit 102 then adds an entry to the load order queue 104 based on the second load instruction. In other words, speculatively executed load instructions not targeting the determined memory region cause an entry to be added to the load order queue 104, while speculatively executed load instructions targeting the determined memory region cause an entry to be added or updated in the page-level tracked load order queue 110.

Assume that an entry for a first load instruction is stored in the page-level tracked load order queue 110 and that the first load instruction is associated with a first thread (e.g., executed by the processor 100). The load store unit 102 receives a query (e.g., via the coherency interface 105) from a second thread (e.g., executed by another processor or core) indicating a store instruction target. If the store instruction target includes a page address of an entry in the page-level tracked load order queue 110, it indicates that an ordering violation has occurred. Accordingly, the execution pipeline is flushed.

The load store unit 102 determines to remove entries from the page-level tracked load order queue 110 based on a state of a reorder buffer 112. The reorder buffer 112 stores speculatively executed instructions and their results for "committing" in program order. For example, the load store unit 102 decrements (e.g., shifts) an activity counter of each entry in the page-level tracked load order queue 110 for every buffer commitment cycle of the reorder buffer 112. A buffer commitment cycle is the reorder buffer 112 committing a number of instructions equal to a number of entries in the reorder buffer 112. For example, assuming the reorder buffer 112 has one hundred entries, a buffer commitment cycle occurs every one hundred committed instructions. When the activity counter of an entry reaches "00" or another determined state, the entry can be removed from the page-level tracked load order queue.

Figure 2:
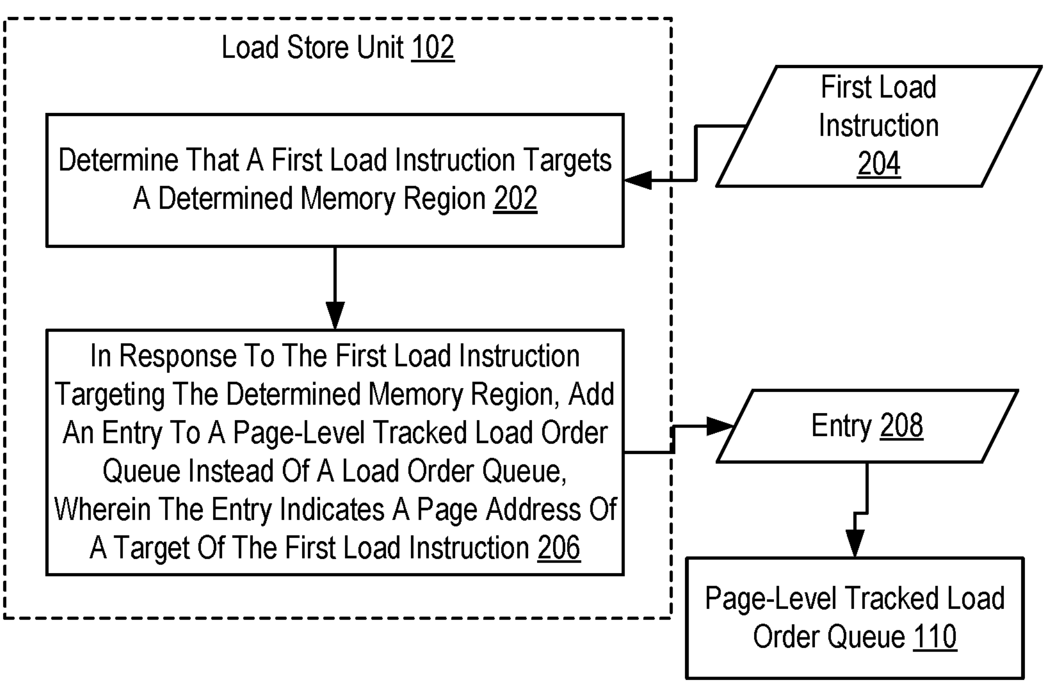
FIG. 2 is a flowchart of an example method for speculative execution using a page-level tracked load order queue according to some embodiments.

For further explanation, FIG. 2 sets forth a flow chart illustrating an exemplary method for speculative execution using a page-level tracked load order queue according to embodiments of the present disclosure that includes determining 202 (e.g., by a load store unit 102) that a first load instruction 204 (e.g., a speculatively executed load instruction) targets a determined memory region. The determined memory region can include the program stack. Accordingly, determining 202 that the first load instruction 204 targets a memory address relative to a stack pointer stored in a stack register 106. For example, the instruction "mov regX, [rsp+offset]" targets the program stack (the determined memory region) as the memory address from which the data is loaded is calculated by adding an offset to the stack pointer in the stack register 106 (identified as "rsp" in the instruction). In contrast, the instruction "mov regX, [regBase+regIndex+offset]" does not target the determined memory area as the memory address from which the data is loaded is independent of the stack pointer.

The method of FIG. 2 also includes in response to the first load instruction 204 targeting the determined memory region, adding 206 (e.g., by the load store unit 102) an entry 208 to a page-level tracked load order queue 110 instead of the load order queue 104, where the entry 208 indicates a page address of a target of the first load instruction 204 (e.g., a page address of a memory location the determined memory region). The page size indicated in the entry is dependent on the minimum page size of the operating system being executed. Thus, for an operating system implementing a 4 kilobyte minimum page size, each entry 208 indicates a 4 kilobyte page address of a page in the determined memory region.

The entry 208 in the page-level tracked load order queue 110 also includes an activity counter indicating a recency at which a load instruction targeting the page of the entry 208 was speculatively executed. For example, the activity counter can include multiple bits (e.g., two bits) initially all set to "1." As additional instructions are executed and/or committed, the activity counter can be right-shifted by one place. For example, a two-bit activity counter set to "11" would be shifted to "01." The activity counter can later be set to "00" indicating that the entry can be removed from the page-level tracked load order queue 110.

For further explanation, FIG. 2 sets forth a flow chart illustrating an exemplary method for speculative execution using a page-level tracked load order queue according to embodiments of the present disclosure that includes determining 202 (e.g., by a load store unit 102) that a first load instruction 204 (e.g., a speculatively executed load instruction) targets a determined memory region; and in response to the first load instruction 204 targeting the determined memory region, adding 206 (e.g., by the load store unit 102) an entry 208 to a page-level tracked load order queue 110 instead of the load order queue 104, where the entry 208 indicates a page address of a target of the first load instruction 204.

Figure 3:
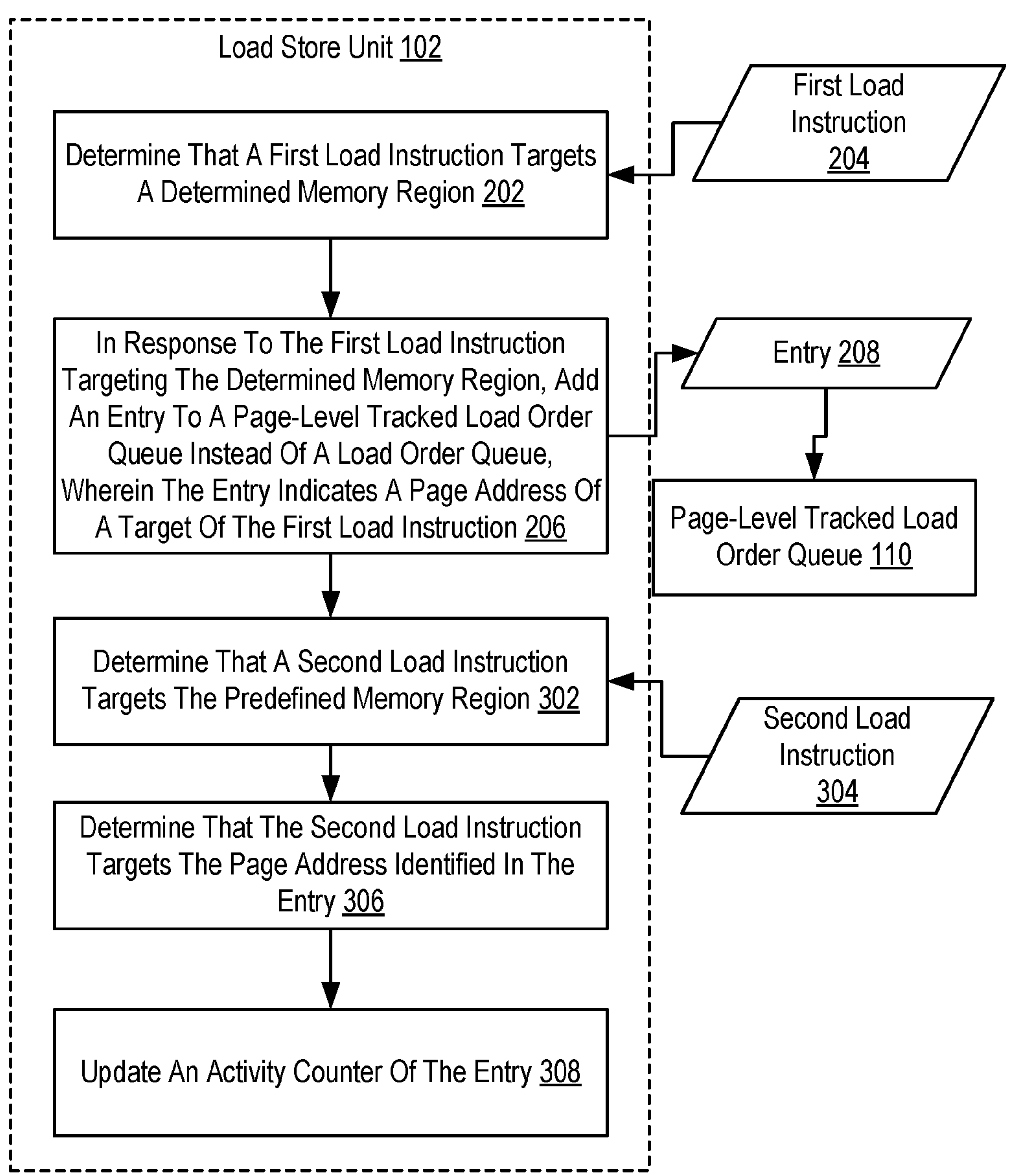
FIG. 3 is a flowchart of an example method for speculative execution using a page-level tracked load order queue according to some embodiments.

The method of FIG. 3 differs from FIG. 2 in that the method of FIG. 3 also includes determining 302 (e.g., by the load store unit 102) that a second load instruction 304 targets the determined memory region (e.g., the program stack as indicated by a stack pointer in the stack register 106). The method of FIG. 3 further differs from FIG. 2 in that the method of FIG. 3 also includes determining 306 that the second load instruction 304 targets the page address identified in the entry 208. For example, the load store unit 102 determines if the page address of the second load instruction 304 target results in a "hit" or match to the entry 208 in the page-level tracked load order queue 110. The method of FIG. 3 further differs from FIG. 2 in that the method of FIG.

3 also includes updating 308 (e.g., by the load store unit 102) the activity counter of the entry 208.

For example, if the activity counter of the entry 208 is set to “01,” the activity counter would be updated to “11.” As another example, if the activity counter of the entry 208 is set to “11,” the activity counter would remain as “11.” Thus, instead of a new entry being added to the page-level tracked load order queue 110 for the second load instruction 304, the activity counter is updated. This allows for multiple speculatively executed load instructions targeting the same page address of the determined memory region to be reflected by a single entry 208 in the page-level tracked load order queue 110.

Figure 4:
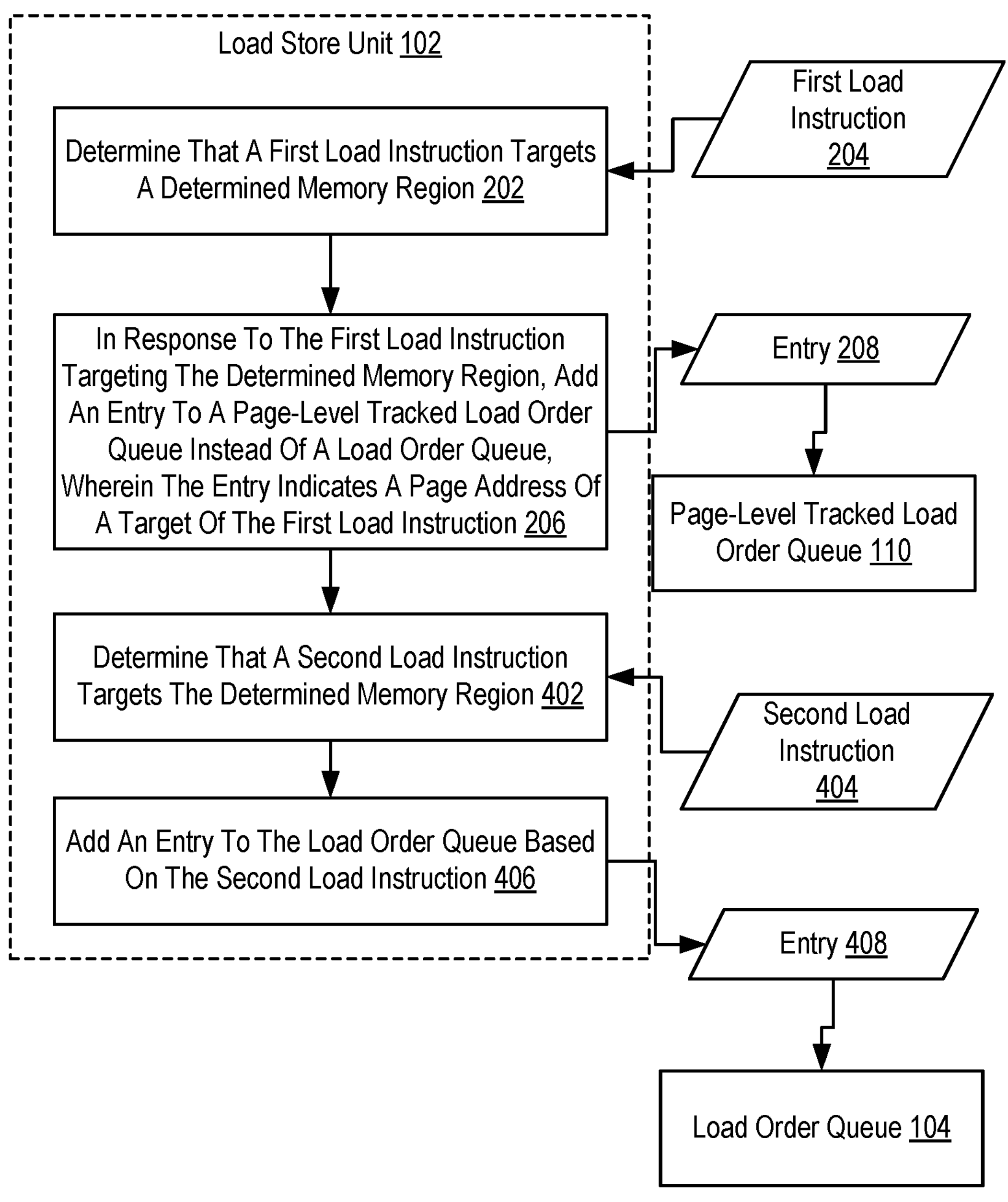
FIG. 4 is a flowchart of an example method for speculative execution using a page-level tracked load order queue according to some embodiments.

For further explanation, FIG. 4 sets forth a flow chart illustrating an exemplary method for speculative execution using a page-level tracked load order queue 110 according to embodiments of the present disclosure that includes determining 202 (e.g., by a load store unit 102) that a first load instruction 204 (e.g., a speculatively executed load instruction) targets a determined memory region; and in response to the first load instruction 204 targeting the determined memory region, adding 206 (e.g., by the load store unit 102) an entry 208 to a page-level tracked load order queue 110 instead of the load order queue 104, where the entry 208 indicates a page address of a target of the first load instruction 204.

The method of FIG. 4 differs from FIG. 2 in that the method of FIG. 4 also includes determining 402 (e.g., by the load store unit 102) that a second load instruction 404 does not target the determined memory region (e.g., the program stack as indicated by a stack pointer in the stack register 106). The method of FIG. 4 differs from FIG. 2 in that the method of FIG. 4 also includes adding 406 an entry 408 to the load order queue 104 based on the second load instruction 404. In other words, speculatively executed load instructions not targeting the determined memory region cause an entry to be added to the load order queue 104, while speculatively executed load instructions targeting the determined memory region cause an entry to be added or updated in the page-level tracked load order queue 110.

Figure 5:
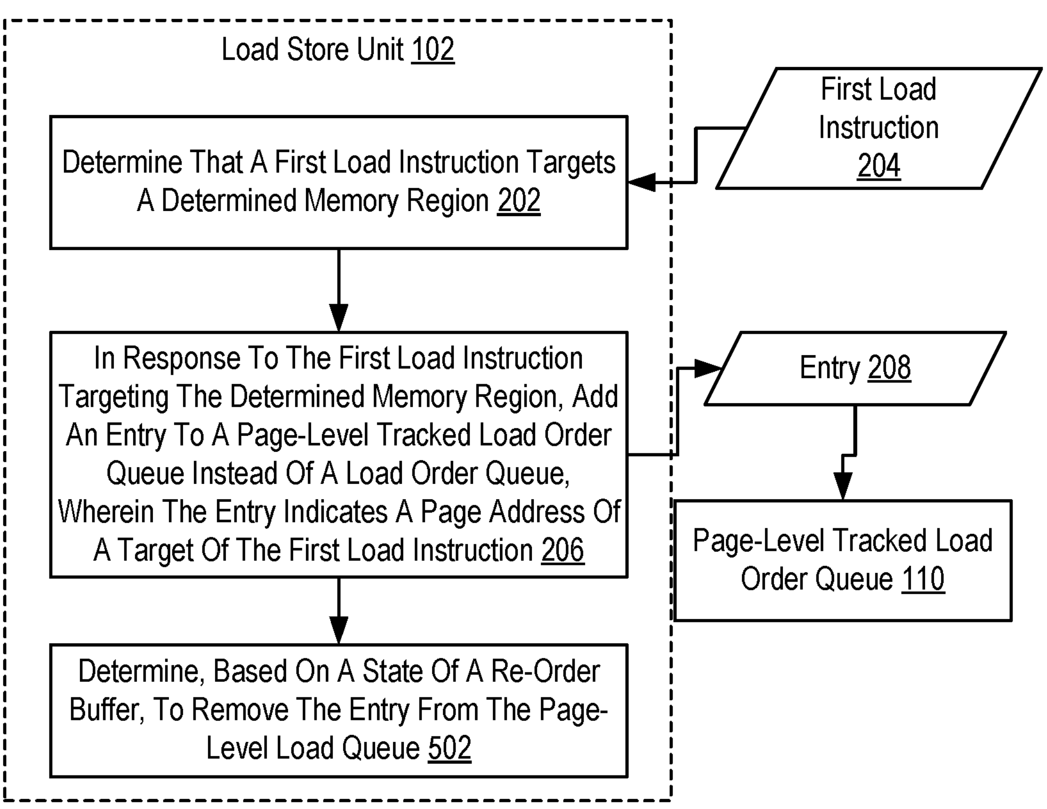
FIG. 5 is a flowchart of an example method for speculative execution using a page-level tracked load order queue according to some embodiments.

For further explanation, FIG. 5 sets forth a flow chart illustrating an exemplary method for speculative execution using a page-level tracked load order queue 110 according to embodiments of the present disclosure that includes determining 202 (e.g., by a load store unit 102) that a first load instruction 204 (e.g., a speculatively executed load instruction) targets a determined memory region; and in response to the first load instruction 204 targeting the determined memory region, adding 206 (e.g., by the load store unit 102) an entry 208 to a page-level tracked load order queue 110 instead of the load order queue 104, where the entry 208 indicates a page address of a target of the first load instruction 204.

The method of FIG. 5 differs from FIG. 2 in that the method of FIG. 5 also includes determining 502 (e.g., by the load store unit 102), based on a state of a reorder buffer 112, to the entry from the page-level tracked load order queue 110. The reorder buffer 112 stores speculatively executed instructions and their results for “committing” in program order. For example, the load store unit 102 decrements (e.g., shifts) an activity counter of each entry in the page-level tracked load order queue 110 for every buffer commitment cycle of the reorder buffer 112. A buffer commitment cycle is the reorder buffer 112 committing a number of instructions equal to a number of entries in the reorder buffer 112. For example, assuming the reorder buffer 112 has one hundred entries, a buffer commitment cycle occurs every one hundred committed instructions. When the activity counter of an entry reaches “00” or another determined state, the entry can be removed from the page-level tracked load order queue. Accordingly, determining 502, based on the state of the reorder buffer 112, the entry 208 includes decrementing, based on the state of the reorder buffer 112 (e.g., a buffer commitment cycle), an activity counter of the entry 208 and removing, based on the activity counter, the entry 208 form the page-level tracked load order queue 110.

Figure 6:
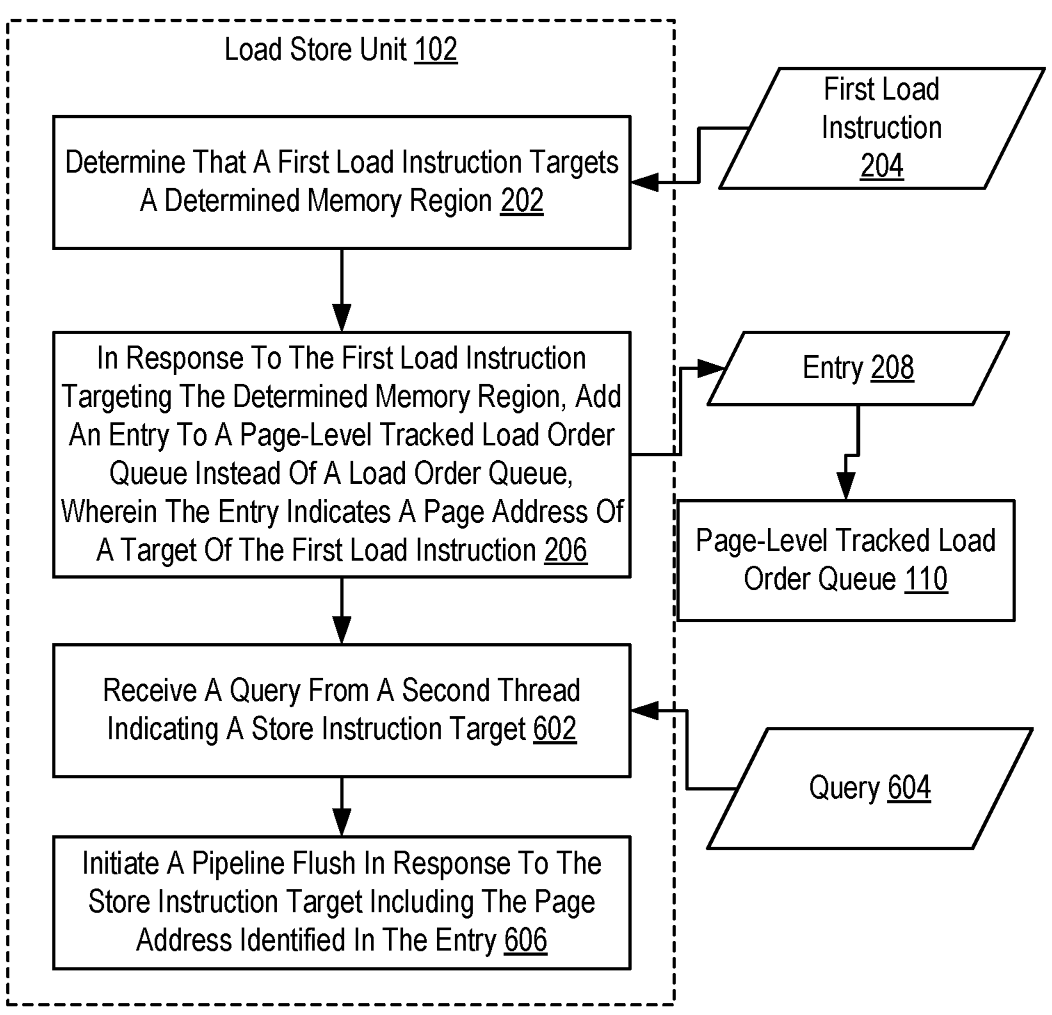
FIG. 6 is a flowchart of an example method for speculative execution using a page-level tracked load order queue according to some embodiments.

For further explanation, FIG. 6 sets forth a flow chart illustrating an exemplary method for speculative execution using a page-level tracked load order queue 110 according to embodiments of the present disclosure that includes determining 202 (e.g., by a load store unit 102) that a first load instruction 204 (e.g., a speculatively executed load instruction) targets a determined memory region; and in response to the first load instruction 204 targeting the determined memory region, adding 206 (e.g., by the load store unit 102) an entry 208 to a page-level tracked load order queue 110 instead of the load order queue 104, where the entry 208 indicates a page address of a target of the first load instruction 204.

The method of FIG. 6 differs from FIG. 2 in that the method of FIG. 6 also includes receiving 602 a query 604 (e.g., via the coherency interface 105) from a second thread (e.g., executed by another processor or core) indicating a store instruction target. The query corresponds to another executed or speculatively executed instruction storing data for the store instruction target (e.g., a memory address). The method of FIG. 6 further differs from FIG. 2 in that the method of FIG. 6 also includes initiating 606 a pipeline flush in response to the store instruction target including the page address identified in the entry 208. For example, the load store unit can determine if a page address included in the store instruction target matches the page address of the entry. Accordingly, an ordering violation has occurred and the execution pipeline is flushed.

In view of the explanations set forth above, readers will recognize that the benefits of speculative execution using a page-level tracked load order queue according to embodiments of the present disclosure include:

Improved performance of a computing system by providing improved storage efficiency of queued speculatively executed load instructions by allowing for multiple loads targeting a same page in a defined memory region to be represented by a single entry.

Improved performance of a computing system by providing more efficient space usage of the load order queue, reducing the likelihood of the load order queue being filled by load instructions targeting the determined memory region, thereby preventing the halting of speculative execution.

Exemplary embodiments of the present disclosure are described largely in the context of a fully functional computer system for speculative execution using a page-level tracked load order queue. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various embodiments of the present disclosure. The descriptions in this specification are for purposes of illustration only and are not to be construed in a limiting sense. The scope of the present disclosure is limited only by the language of the following claims.

What is claimed is:

1. A method for speculative execution using multiple queues including at least a first queue and a second queue, the method comprising:

adding a first entry to the first queue for a first load instruction based on the first load instruction targeting a memory area outside of a current program stack, wherein each entry in the first queue identifies a particular memory address; and adding a second entry to the second queue for a second load instruction based on the second load instruction targeting the current program stack, wherein each entry in the second queue identifies a page of memory.

2. The method of claim 1, further comprising:

updating an activity counter of the second entry in response to a third load instruction that targets the current program stack and targets a page address identified in the second entry.

3. The method of claim 1, further comprising removing, based on a state of a re-order buffer, the second entry from the second queue.

4. The method of claim 3, wherein removing, based on the state of the re-order buffer, the second entry from the second queue comprises:

decrementing, based on the state of the re-order buffer, an activity counter of the second entry; and removing the second entry from the second queue based on the activity counter.

5. The method of claim 1, further comprising determining that the second load instruction targets a memory address relative to a stack pointer.

6. The method of claim 1, wherein the second load instruction is associated with a first thread, and the method further comprises:

receiving a query from a second thread indicating a store instruction target; and initiating a pipeline flush in response to the store instruction target comprising a page address identified in the second entry.

7. The method of claim 1, wherein the second queue is a page-level tracked load order queue.

8. A load store unit for speculative execution using multiple queues including at least a first queue and a second queue, the load store unit configured to:

add a first entry to the first queue for a first load instruction based on the first load instruction targeting a memory area outside of a current program stack, wherein each entry in the first queue identifies a particular memory address; and add a second entry to the second queue in response to a second load instruction that targets the current program stack, wherein each entry in the second queue identifies a page of memory.

9. The load store unit of claim 8, wherein the load store unit is further configured to:

update an activity counter of the second entry in response to a third load instruction that targets the current program stack and target a page address identified in the second entry.

10. The load store unit of claim 8, wherein the load store unit is further configured to remove, based on a state of a re-order buffer, the second entry from the second queue.

11. The load store unit of claim 10, wherein the load store unit removes the second entry from the second queue by:

decrementing, based on the state of the re-order buffer, an activity counter of the second entry; and removing the second entry from the second queue based on the activity counter.

12. The load store unit of claim 8, wherein the load store unit is further configured to determine that the second load instruction targets a memory address relative to a stack pointer.

13. The load store unit of claim 8, wherein the second load instruction is associated with a first thread, and the load store unit is further configured to:

receive a query from a second thread indicating a store instruction target; and initiate a pipeline flush in response to the store instruction target comprising a page address identified in the second entry.

14. A processor for speculative execution using multiple queues, comprising:

a first queue comprising a plurality of entries each identifying a particular memory address, wherein the processor is configured to add a first entry to the first queue for a first load instruction based on the first load instruction targeting a memory area outside of a current program stack; and a second queue comprising a plurality of entries each identifying a page of memory, wherein the processor is configured to add a second entry to the second queue for a second load instruction based on the second load instruction targeting the current program stack.

15. The processor of claim 14, wherein the processor is further configured to:

update an activity counter of the second entry in response to a third load instruction that targets the current program stack and targets a page address identified in the second entry.

16. The processor of claim 14, wherein the processor is further configured to remove, based on a state of a re-order buffer, the second entry from the second queue.

17. The processor of claim 16, wherein the processor removes the second entry from the second queue by:

decrementing, based on the state of the re-order buffer, an activity counter of the second entry; and removing the second entry from the second queue based on the activity counter.

18. The processor of claim 14, wherein the second load instruction targets a memory address relative to a stack pointer.

19. The processor of claim 14, wherein the second load instruction is associated with a first thread, and the processor is further configured to:

receive a query from a second thread indicating a store instruction target; and initiate a pipeline flush in response to the store instruction target comprising a page address identified in the second entry.

20. The processor of claim 14, wherein the second queue is a page-level tracked load order queue.

* * * * *